(12) United States Patent
Hartz et al.

(10) Patent No.: US 6,666,351 B1
(45) Date of Patent: Dec. 23, 2003

(54) DISPENSER STRUCTURE FOR CHAFF COUNTERMEASURES

(75) Inventors: Andrew D. Hartz, Noblesville, IN (US); Charles M. Poi, Jr., Indianapolis, IN (US); Robert A. Bailey, Avon, IN (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/040,035

(22) Filed: Jan. 3, 2002

(51) Int. Cl.[7] .............................................. B65G 59/00
(52) U.S. Cl. ...................................... 221/258; 102/342
(58) Field of Search ............................... 221/76, 78, 75, 221/258, 277; 102/336, 342, 501, 503, 504; 89/1.51

(56) References Cited

U.S. PATENT DOCUMENTS

| | | |
|---|---|---|
| 4,524,670 A | 6/1985 | Billard et al. |
| 5,074,216 A | 12/1991 | Dunne et al. |
| 5,136,951 A | 8/1992 | Herrlinger |
| 5,413,024 A | 5/1995 | Plummer |
| 5,464,699 A | 11/1995 | Baldi |
| 5,472,533 A | 12/1995 | Herbage et al. |
| 5,915,694 A | * 6/1999 | Brum .......................... 273/359 |
| 6,055,909 A | 5/2000 | Sweeny |

\* cited by examiner

Primary Examiner—Kenneth W. Noland
(74) Attorney, Agent, or Firm—William C. Schubert; Glenn H. Lenzen, Jr.

(57) ABSTRACT

A dispenser structure for chaff countermeasures includes at least one chaff dispenser having a dispenser tube with a tube sidewall, a dispensing opening, and a female thread structure in an inner surface of the tube sidewall, and a male worm gear engaged to the female thread structure of the dispenser tube. A drive structure has a motor mount upon which the worm gear is rotatably supported, with the motor mount being mechanically reacted to prevent the motor mount from turning, and a drive motor affixed to the motor mount and having a motor output connected to the worm gear to controllably turn the worm gear. Chaff countermeasures are disposed within the dispenser tube between the worm gear and the dispensing opening, so that they may be pushed out the dispensing opening as the motor turns the worm gear.

22 Claims, 3 Drawing Sheets

DISPENSER STRUCTURE FOR CHAFF COUNTERMEASURES

This invention relates to chaff-type countermeasures used by military aircraft and, more particularly, to a dispenser used to eject chaff-type countermeasures from aircraft.

BACKGROUND OF THE INVENTION

Controllably deployable countermeasures of several types are used to deter and defeat attacks on aircraft by other aircraft, missiles, and antiaircraft artillery. Examples of such countermeasures include chaff employed to create false infrared or radar returns and flares that produce large heat signatures when viewed by infrared sensors. In each case, the countermeasure is deployed by an aircraft to confuse an attacker, and specifically the sensor used by the attacker, and to lure the attacker away from the deploying aircraft.

The present invention is concerned with dispensing chaff from the aircraft in a controlled manner. There are many types of chaff, including both passive chaff and active chaff. Examples include passive radar reflecting or absorbing materials, active combustibles or pyrophorics that generate heat in the infrared spectrum, and passive smoke or dust that obscures detection in the visible spectrum.

One type of chaff of particular interest is pyrophoric chaff. A pyrophoric material, such as described in U.S. Pat. No. 5,464,699, is coated onto thin strips of plastic that are encased in an air-tight film package. A large number of the individual packages of pyrophoric material are loaded into a dispenser and ejected when needed. As each package is ejected from the dispenser, the film is ruptured so that the pyrophoric material, upon contacting the air, ignites to produce an infrared signature. There may be several dispensers on the aircraft, each loaded with different types of pyrophoric materials. The types of pyrophoric material dispensed, the number of packages dispensed, and the rate and sequencing of the dispensing of the pyrophoric packages may be controlled to more-effectively simulate the heat signature of the engines of the protected aircraft than possible with conventional flares, thereby offering improved protection against infrared-sensor-guided attacks.

Pyrophoric-countermeasure dispensers are known, see for example U.S. Pat. No. 6,055,909, whose disclosure is incorporated by reference. Such dispensers must be controllable so that the packages of pyrophoric material may be controllably dispensed upon command. They must also provide maximum flexibility in use yet be standardized to minimize logistical support requirements. Dispensers such as that of the '909 patent are fully operable and suitable for many missions, but the present inventors have recognized that, for other missions, they may have drawbacks.

There is accordingly a need for an improved chaff countermeasure dispenser. The improved chaff dispenser is needed for pyrophoric chaff, and for other types of chaff as well. The present invention fulfills this need, and further provides related advantages.

SUMMARY OF THE INVENTION

The present invention provides a dispenser structure for chaff countermeasures. The chaff dispenser is fully functional to deploy chaff countermeasures upon command, in the numbers and at the rates required by the countermeasure controller. The chaff dispenser structure is reusable, and may be reloaded either with the dispenser tube remaining on the aircraft or detached from the aircraft. The present approach is mechanically more robust that prior dispensers of chaff countermeasures. It also provides a basic chaff dispenser configuration that is readily used in a wide variety of sizes and capacities of chaff dispensers. The design is not complex, and there is a low parts count that reduces manufacturing costs and support requirements. Each chaff dispenser is suitable for modular assembly with other compatible chaff dispensers, to build up highly flexible countermeasure systems.

In accordance with the invention, a dispenser structure for chaff countermeasures includes at least one chaff dispenser. Each chaff dispenser comprises a dispenser tube having a tube sidewall, a dispensing opening, and a female thread structure in an inner surface of the tube sidewall. A male worm gear is threadably engaged to the female thread structure of the dispenser tube. A drive structure comprises a motor mount upon which the worm gear is rotatably supported. The motor mount is mechanically reacted, preferably against the dispenser tube itself, to prevent the motor mount from turning responsive to its own torque. A drive motor, preferably an electrical motor, is affixed to the motor mount and has a motor output connected to the worm gear to controllably turn the worm gear. At least one chaff countermeasure, and typically a plurality of chaff countermeasures, are disposed within the dispenser tube axially between the worm gear and the dispensing opening. A drive plate is preferably positioned between the worm gear and the at least one chaff countermeasure. There may be a pop-off cap overlying the dispensing opening of the dispenser tube that is pushed off when the motor operates to turn the worm gear and force the chaff material out of the dispensing opening.

The dispenser tube may have any cross-sectional shape. In one preferred embodiment, the dispenser tube has a prismatic cross-sectional shape such as a square cross-sectional-shape. In that case, the female thread structure is a segmented thread structure of noncontinuous threads in the prism faces.

The chaff dispenser structure desirably further includes a support housing in which the dispenser tube is received. The support housing allows at least two, and preferably a number of, the chaff dispensers to be connected together to form a dispenser array.

More generally, a dispenser structure for chaff countermeasures includes at least one chaff dispenser. Each chaff dispenser comprises a dispenser tube having a dispensing opening, and a drive structure comprising a motor that moves along the dispenser tube as the chaff countermeasures are dispensed from the dispensing opening.

The dispenser structure of the invention places a drive motor in each dispenser tube. The drive motor, operating through the worm gear, forces the chaff material, in packaged or unpackaged form, out of the dispensing opening of the dispenser tube upon command. The entire drive motor and worm gear move along the interior of the dispenser tube as the packages are dispensed. There is therefore no long drive shaft that must extend most of the length of the dispenser tube, so that the one type of drive structure may be readily used with any length of dispenser tube. Since the drive structure is the only part of the dispenser structure that requires significant maintenance, only a single set of spares or replacement parts is required.

The present design is also more robust than a dispenser design requiring a long shaft to push the chaff material out of the dispenser. A long shaft requires strong support bearings, and the shaft and bearings must be suitable to withstand large aircraft maneuvering forces when the shaft is fully extended. The dispenser tube must be made overly long to contain the full length of the shaft in its retracted position. The present approach, by contrast, moves the entire drive motor structure down the interior of the dispenser tube as the chaff is dispensed, so that the space within the dispenser tube is used most effectively and large shaft support bearings are not required. There is no long shaft cantilevered on bearings, so that the present design is more resistant to the forces generated during aircraft maneuvering. The same drive structure works equally well with dispenser tubes of any length and cross-sectional configuration.

With a modular support housing to support the chaff dispensers, arrays of such dispensers may be constructed in a bolt-together fashion, providing maximum flexibility for the countermeasures system.

The present dispenser structure and chaff dispenser are operable with a wide variety of types of chaff. The dispensing of pyrophoric chaff is of particular interest. However, other types of chaff such as aluminized plastic radar chaff, metallic chaff, and the like may be dispensed using the present approach.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
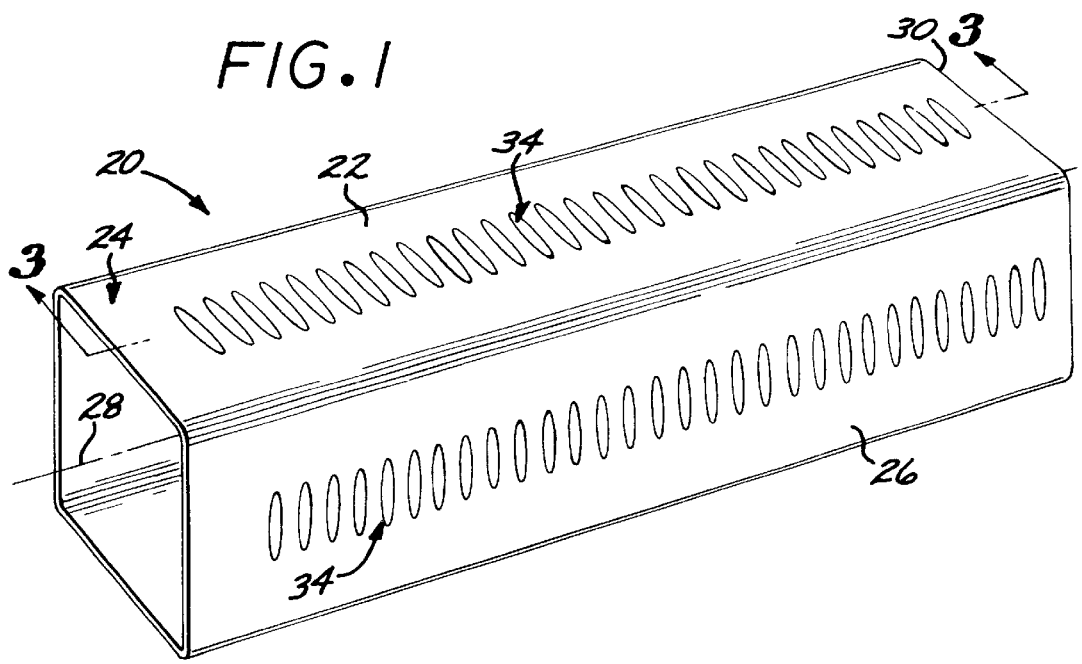
FIG. 1 is an exterior perspective view of a chaff dispenser.
Figure 2:
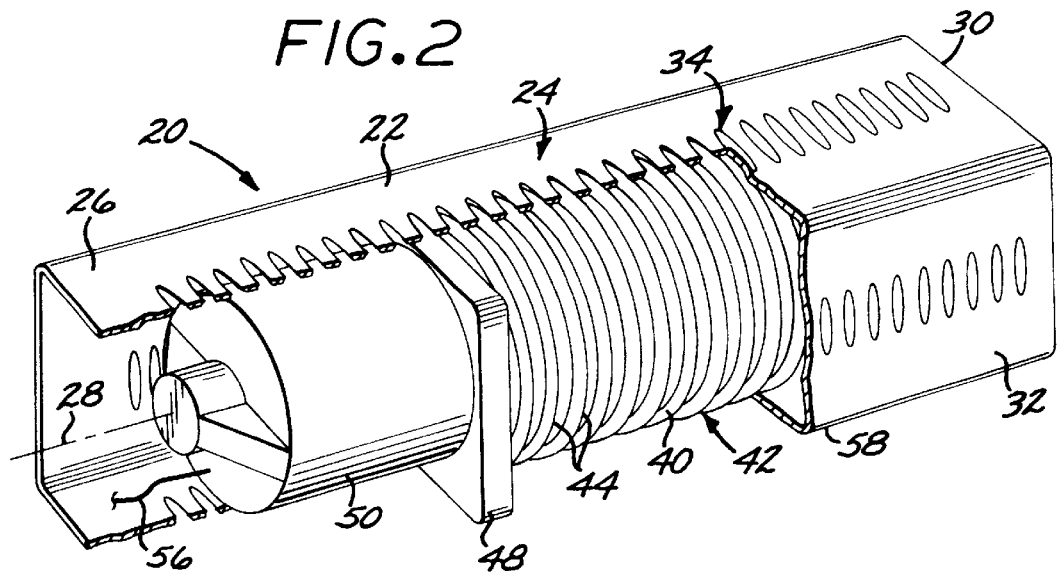
FIG. 2 is a cutaway view of the chaff dispenser of FIG. 1.
Figure 3:
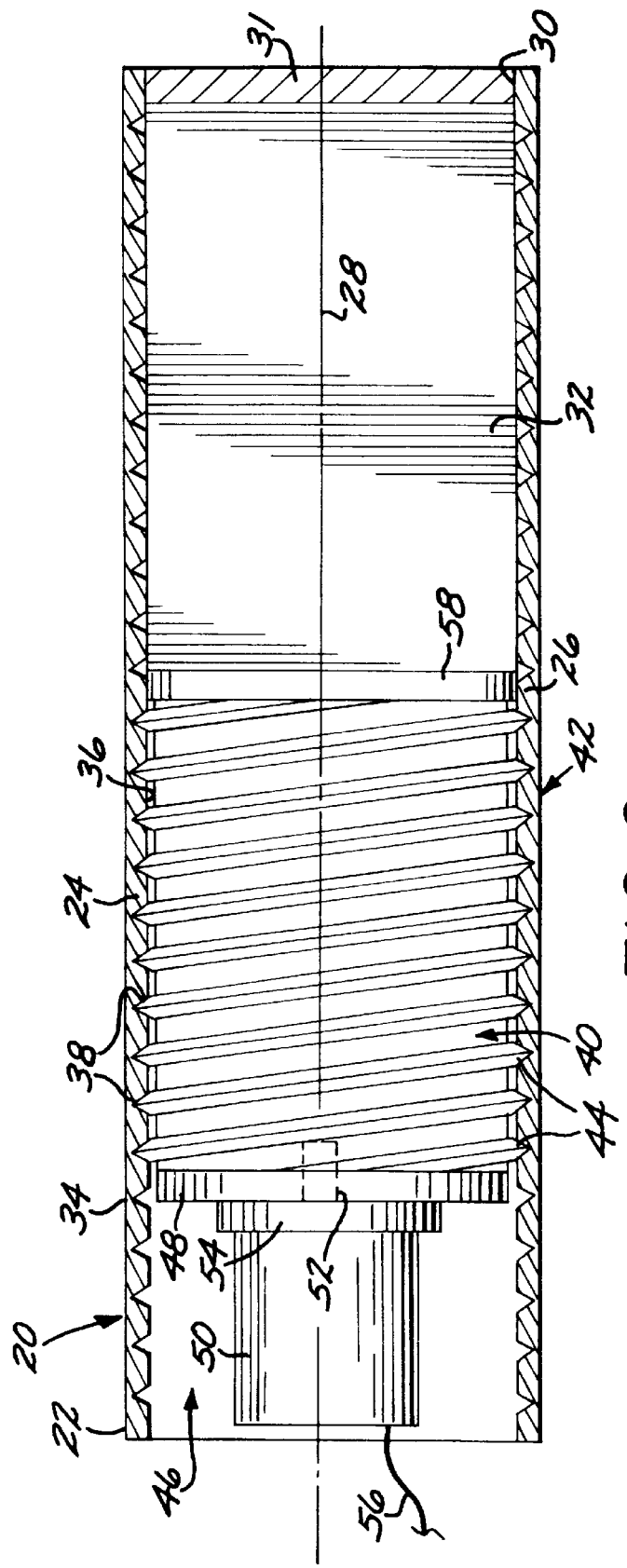
FIG. 3 is a sectional view, taken on line 3—3, of the chaff dispenser of FIG. 1 with some modifications.

FIGS. 1–3 depict a dispenser structure 20 for chaff countermeasures. As used herein, "chaff" is a finely divided material, in the form of particles, foils, filaments, strips, and the like, ejected from the aircraft as a countermeasure intended to interfere with or confuse any type of detection device. The chaff may be provided in a loose, unpackaged form, but more preferably is packaged in discrete packages that are dispensed and which rupture to scatter the chaff. The dispenser structure 20 includes a chaff dispenser 22 having a dispenser tube 24. The dispenser tube 24 may be made of a relatively thin sheet metal, preferably about 1/16 inch or more thick, formed into the desired shape with tube sidewalls 26. The dispenser tube may instead have thicker sidewalls 26, on the order of 1/4–3/8 inch thick, and may be made by extrusion. The dispenser tube 24 is illustrated as having a square cross-sectional shape in a section taken perpendicular to a tube axis 28. The dispenser tube 24 may have other shapes when viewed in the plane perpendicular to the tube axis 28, such as another prismatic shape (e.g., a hexagon) or a circle. The dispenser tube 24 has a dispensing opening 30 at one end thereof, which may be closed with an optional pop-off cap 31. The chaff material 32 contained in the dispenser tube 24 is dispensed or ejected through the dispensing opening 30 when the chaff dispenser 22 is operated. In the case of pyrophoric chaff, the chaff is typically in the form of thin packages containing the pyrophoric chaff material 32.

The tube sidewall 26 includes a female thread structure 34 in an inner surface 36 of the tube sidewalls 26. The female thread structure 34 extends most of the length of the dispenser tube 24. In the embodiments of FIGS. 1 and 2, a female thread 38 is formed by slit; like openings extending completely through the tube sidewall 24. In the embodiment of FIG. 3, the thread 38 does not extend through the entire thickness of the tube sidewall 34, and the thickness of the sidewall would typically be greater than for the embodiments of FIGS. 1–2. Because the dispenser tube 24 is square in cross section, the female thread structure 34 is a segmented thread structure defined by a noncontinuous thread 38 in the tube sidewall 26. Any operable pitch of the female thread 38 may be used. Desirably, the female thread 38 is relatively coarse, for example having a pitch that produces about 1/8 to 1/4 inch of advance per revolution, but lower or higher pitches may be selected for specific applications.

A male worm gear 40 lies inside the dispenser tube 24. The worm gear 40 includes a male thread structure 42 with a male thread 44. The male thread 44 of the male thread structure 42 has the same pitch as, and is threadably engaged to, the female thread 38 of the female thread structure 34 of the dispenser tube 24. When rotated about the tube axis 28, the worm gear 40 moves parallel to the tube axis 28.

A drive structure 46 comprises a motor mount 48 upon which the worm gear 40 is rotatably supported in appropriate bearings. The motor mount 48 is mechanically reacted, preferably against the dispenser tube 24 as illustrated, to prevent the motor mount 48 from turning about the tube axis 28. A drive motor 50 is affixed to the motor mount 48. The drive motor 50 has a rotatable motor output shaft 52 connected directly to the worm gear 40, or connected to the worm gear 40 through a speed reducer gear 54, to controllably turn the worm gear 40. The drive motor 50 is preferably an electrical motor, with an electrical cable 56 extending to a dispenser controller (not shown) which commands the operation of the drive motor 50 and thence the chaff dispenser 22.

With this drive structure 46, the entire drive structure 46, which includes the drive motor 50 and other components, moves along and parallel to the tube axis 28 as the drive motor 50 turns the worm gear 40. A single drive structure 46 is used for any length of dispenser tube 24, an important advantage in a military application because it is not necessary to stock and maintain many different types of drive structures 46. There is no long shaft that extends from a stationary motor to push against the back side of the chaff material. Such a long shaft requires strong bearings and a different length of shaft for each length of the dispenser tube. The use of a long shaft would also lengthen the dispenser tube 24 and possible lead to instability in the shaft during aircraft maneuvering.

In this chaff dispenser 22, the flat, disk-like packages or other forms of the chaff material 32 lie between the worm gear 40 and the dispensing opening 30. A drive plate 58 may be, and preferably is, disposed between the worm gear 40 and the chaff material 32 of the chaff countermeasure. The drive plate 58 ensures an even pressure against the chaff material 32 as the worm gear 40 advances.

Figure 4:
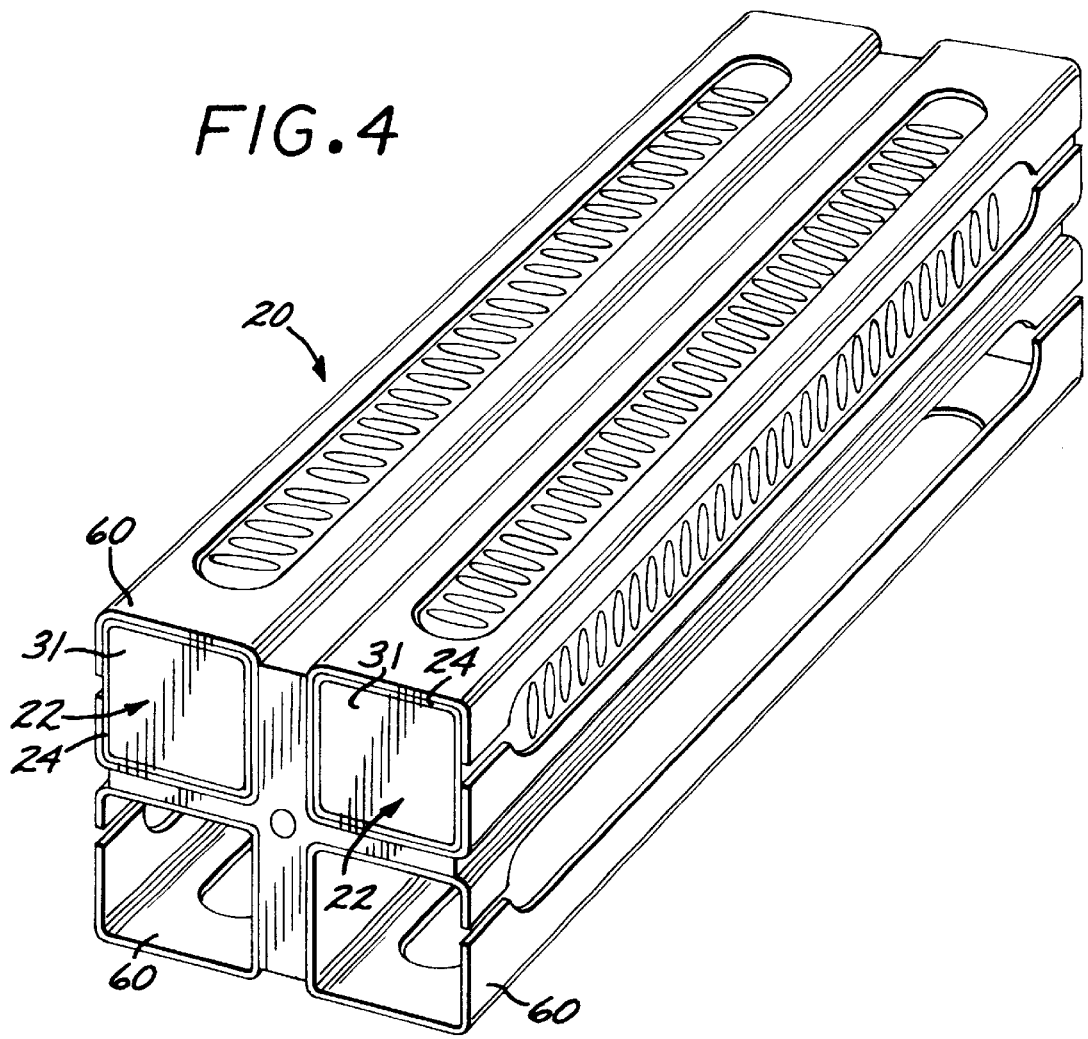
FIG. 4 is a perspective view of a dispenser structure having provision for four chaff dispensers.

As seen in FIG. 4, the dispenser structure 20 also preferably includes a support housing 60 in which the dispenser tube 24 and its contained structure are received. At least two, and preferably several, of the support housings 60 may be attached together to form a modular dispenser array. In the embodiment illustrated in FIG. 4, there is provision for four of the chaff dispensers 22 in their respective support housings 60 to be joined together in the modular dispenser array. Because each of the chaff dispensers contains its own individual drive structure 46 and all other operating components, the chaff dispensers 22 may be joined together by their support housings 60 without further interconnections. Their respective electrical cables 56 extend to the respective dispenser controllers (not shown), which are typically in the aircraft to which the support housings 60 are attached.

The chaff dispenser 22 is normally supplied with the chaff material 32 loaded therein, the drive structure 46 fully retracted (i.e., moved to the left in FIG. 3) and the cap 31 in place. The chaff dispenser 22 is inserted into and affixed to its support housing 60, which is then affixed to other support housings 60 to form an array that is attached to the aircraft, or is attached to the aircraft directly. When the chaff dispenser 22 is to be used, the drive motor 50 is operated to turn the worm gear and move the drive structure 46 toward the right in the view of FIG. 3. The cap 31 is popped off, and the chaff material 32 is dispensed through the dispensing opening 30 at a rate and in a number determined by the dispenser controller. All or only a portion of the chaff material 32 may be dispensed at a time. When the mission is complete, the chaff dispenser 22 is reloaded with new chaff material 32 by operating the drive motor 50 to move the drive structure 46 to the retracted position (the leftmost position possible in FIG. 3), loading new chaff material 32, and, replacing the cap 31. The chaff dispenser 22 is ready to return to service.

Although a particular, embodiment of the invention has been described in detail for purposes of illustration, various modifications and enhancements may be made without departing from the spirit and scope of the invention. Accordingly, the invention is not to be limited except as by the appended claims.

What is claimed is:

1. A dispenser structure for chaff countermeasures including at least one chaff dispenser, each chaff dispenser comprising:
    a dispenser tube having a tube sidewall, a dispensing opening, and a female thread structure in an inner surface, of the tube sidewall;
    a male worm gear threadably engaged to the female thread structure of the dispenser tube; and
    a drive structure comprising
        a motor mount upon which the worm gear is rotatably supported, the motor mount being mechanically reacted to prevent the motor mount from turning, and
        a drive motor affixed to the motor mount and having a motor output connected to the worm gear to controllably turn the worm gear.

2. The dispenser structure of claim 1, wherein the chaff dispenser further includes
    at least one chaff countermeasure disposed within the dispenser tube between the worm gear and the dispensing opening.

3. The dispenser structure of claim 2, wherein the chaff dispenser further includes
    a drive plate disposed between the worm gear and the at least one chaff countermeasure.

4. The dispenser structure of claim 1, wherein the chaff dispenser further includes
    a pop-off cap overlying the dispensing opening of the dispenser tube.

5. The dispenser structure of claim 1, wherein the dispenser tube has a prismatic cross-sectional shape.

6. The dispenser structure of claim 1, wherein the dispenser tube has a prismatic cross-sectional shape, and wherein the female thread structure is a segmented thread structure of noncontinuous threads in the tube sidewall.

7. The dispenser structure of claim 1, wherein the dispenser tube has a square cross-sectional shape.

8. The dispenser structure of claim 1, wherein the dispenser tube has a square cross-sectional shape, and wherein the female thread structure is a segmented thread structure of noncontinuous threads in the tube sidewall.

9. The dispenser structure of claim 1, wherein the drive motor is an electrical motor.

10. The dispenser structure of claim 1, wherein the dispenser structure further includes
    a support housing in which the dispenser tube is received.

11. The dispenser structure of claim 1, wherein the dispenser structure comprises at least two of the chaff dispensers each having the structure set forth in claim 1.

12. The dispenser structure of claim 1, wherein the motor mount is mechanically reacted against the dispenser tube.

13. A dispenser structure for chaff countermeasures including at least one chaff dispenser, each chaff dispenser comprising:
    a dispenser tube having a tube sidewall, a dispensing opening, and a female thread structure in an inner surface of the tube sidewall, wherein the dispenser tube has a prismatic cross-sectional shape, and wherein the female thread structure is a segmented thread structure of noncontinuous threads in the tube sidewall;
    a male worm gear threadably engaged to the female thread structure of the dispenser tube;
    a drive structure comprising
        a motor mount upon which the worm gear is rotatably supported, the motor mount mechanically reacting against the dispenser tube to prevent the motor mount from turning, and
        a drive motor affixed to the motor mount and having a motor output connected to the worm gear to controllably turn the worm gear; and
    a plurality of chaff countermeasure packets disposed within the dispenser tube between the worm gear and the dispensing opening.

14. The dispenser structure of claim 13, wherein the chaff dispenser further includes
    a drive plate disposed between the worm gear and the plurality of chaff countermeasure packets.

15. The dispenser structure of claim 13, wherein the chaff dispenser further includes
    a pop-off cap overlying the dispensing opening of the dispenser tube.

16. The dispenser structure of claim 13, wherein the dispenser tube has a square cross-sectional shape.

17. The dispenser structure of claim 13, wherein the drive motor is an electrical motor.

18. The dispenser structure of claim 13, wherein the dispenser structure further includes
    a support housing in which the dispenser tube is received.

19. The dispenser structure of claim 13, wherein the dispenser structure comprises at least two of the chaff dispensers each having the structure set forth in claim 1.

20. A dispenser structure for chaff countermeasures including at least one chaff dispenser, each chaff dispenser comprising:
    a dispenser tube having a dispensing opening; and a drive structure comprising a drive motor that moves along the dispenser tube as the chaff countermeasures are dispensed from the dispensing opening, wherein there is no shaft that extends from a stationary motor to push against a chaff countermeasure.

21. A dispenser structure for chaff countermeasures including at least one chaff dispenser, each chaff dispenser comprising:

a dispenser tube having a dispensing opening; and a drive structure comprising a drive motor that moves along the dispenser tube as the chaff countermeasures are dispensed from the dispensing opening, wherein the drive structure is the same regardless of a length of the dispenser tube.

22. A dispenser structure for chaff countermeasures including at least one chaff dispenser, each chaff dispenser comprising:

a dispenser tube having a dispensing opening; and a drive structure comprising an electric drive motor that moves along the dispenser tube as the chaff countermeasures are dispensed from the dispensing opening.

* * * * *